United States Patent [19]

Birch

[11] Patent Number: 4,841,238

[45] Date of Patent: Jun. 20, 1989

[54] GAUGE DRIVING SYSTEM

[75] Inventor: Barry Birch, Abbeyfeale, Ireland

[73] Assignee: Lucas Industries Public Limited Company, Birmingham, England

[21] Appl. No.: 133,078

[22] Filed: Dec. 15, 1987

[30] Foreign Application Priority Data

Dec. 17, 1986 [GB] United Kingdom ............... 8630086

[51] Int. Cl.$^4$ ............................................. G01R 1/20
[52] U.S. Cl. ...................................... 324/144; 324/167; 324/168
[58] Field of Search ............... 324/144, 146, 147, 163, 324/164, 166, 167, 168, 172, 173, 174, 177, 171; 307/254, 270, 515

[56] References Cited

U.S. PATENT DOCUMENTS

| | | | |
|---|---|---|---|
| 3,946,311 | 3/1976 | Baker et al. | 324/167 |
| 4,001,776 | 1/1977 | Carol, Jr. et al. | 340/815.02 X |
| 4,051,434 | 9/1977 | Sweet | 324/166 X |
| 4,167,699 | 9/1979 | Baker | 324/166 X |
| 4,228,396 | 10/1980 | Palombo et al. | 324/171 X |
| 4,230,984 | 10/1980 | Taylor | 324/140 R X |

Primary Examiner—Reinhard J. Eisenzopf
Assistant Examiner—Robert W. Mueller
Attorney, Agent, or Firm—Nixon & Vanderhye

[57] ABSTRACT

An air-core gauge comprising two coils in quadrature has a driving system with switches on a junction terminal and end terminals of the two coils, and a drive circuit controlling the switches so that each terminal is selectively at either of two signal levels, with one terminal being connected alternately to the two signal levels with variable duty cycle depending upon the angle through which the pointer of the gauge is to be turned. For any given angle, one terminal is held at one level, another at the other level and the third is alternated between the two levels with appropriate duty cycle. Any angle of pointer deflection from 0°–360° can be achieved with just the two voltage levels and calculating the duty cycle from an appropriate function of tangent values of angles in the range 0° to 45°.

11 Claims, 4 Drawing Sheets

GAUGE DRIVING SYSTEM

This invention relates to a system for driving an air-core gauge, serving for example as a speedometer or tachometer for a road vehicle.

An air-core gauge comprises two coils disposed at right angles to each other and a freely-rotatable axle mounting a magnet and a pointer. The pointer can be deflected through any angle up to 360° by passing appropriate electrical currents through the two coils in order to turn the magnet (and hence the axle and pointer) through that angle. However, known electrical drive systems for such gauges are complex in various respects, requiring typically to the coils simultaneously (e.g. analogue signals representing respectively the sine and cosine of the angle to which the pointer is to be turned) and/or three supply rails to which the coils can be selectively connected.

We have now devised a driving system for an air-core gauge, which overcomes these drawbacks of the known systems.

In accordance with this invention, there is provided a driving system for an air-core gauge, comprising switching means for selectively connecting a junction between the two coils of the gauge to either of two signal levels, for selectively connecting an opposite end of one coil to either of said two signal levels and for selectively connecting an opposite end of the second coil to either of said two levels, and a drive circuit for controlling said switching means such that one of said junction and said opposite ends of the coils is connected alternately to said two signal levels with variable duty cycle depending upon the angle through which the pointer of the gauge is to be turned.

With this driving system, only two signal levels required and no complex arrangements are needed for generating variable analogue drive signals. In a preferred embodiment, for maintaining the pointer at any given angle between 0° and 360°, a variable duty signal is applied to only one of the three coil terminals (i.e. junction of the two coils and their opposite ends), whilst the other two terminals are maintained at one or other of the two signal levels. Moreover, in this preferred embodiment, the duty cycle of the variable duty signal changes from 0 to 1 (or from 1 to 0) over a range of angles for the pointer, to progressively change the respective terminal from one signal level to the other. Then for the next range of angles for the pointer, this terminal is maintained at its new signal level and another one of the three terminals receives the variable duty signal for progressively changing its signal level.

An embodiment of this invention will now be described by way of example only and with reference to the accompanying drawings, in which.

Figure 1:
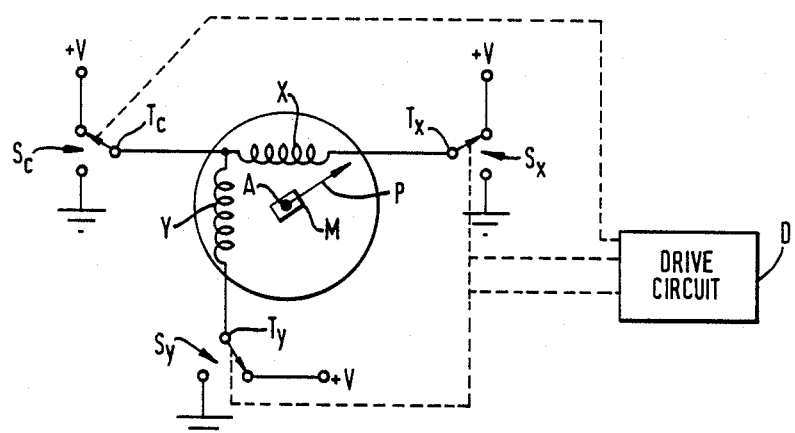
FIG. 1 is a diagram of the principal elements of an air-core gauge and a driving system in accordance with this invention.

Referring to FIG. 1, an air-core gauge comprises two identical coils X,Y disposed at right angles to each other, or in quadrature, and a freely-rotatable axle A mounting a magnet M and an indicating pointer P. Each coil has one end connected to one end of the other coil and this junction of the two coils is connected to a terminal Tc. The opposite ends of the two coils are connected to respective terminals Tx,Ty. The driving system for the gauge comprises switching means for selectively connecting each of the terminals Tc,Tx and Ty to either of two voltage levels 0 or +V and FIG. 1 shows this switching means diagrammatically as comprising respective switches Sc, Sx and Sy each having a movable contact connected at one of its ends to the respective terminal and for connecting at its other end to the ground or +V voltage levels. A drive circuit D serves to control these switches in a manner which will now be described with reference to FIG. 2.

Figure 2:
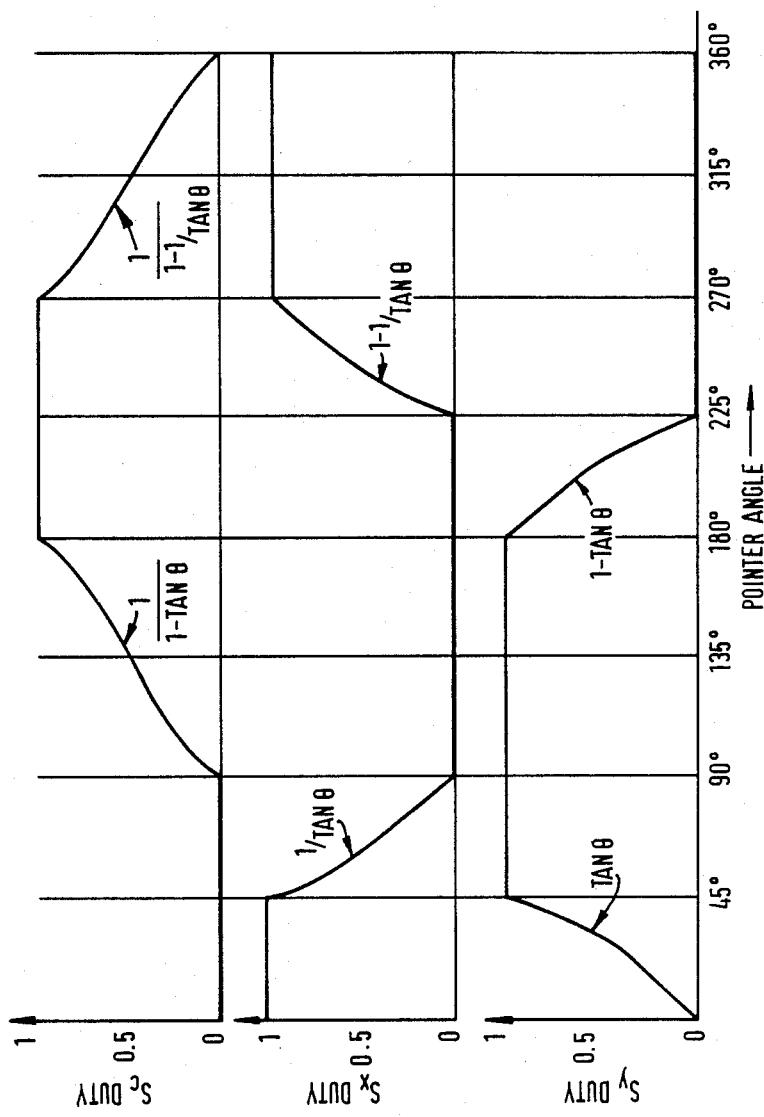
FIG. 2 is a waveform diagram showing the signal levels applied by the driving system to the ends of the two coils of the gauge for producing any required deflection of the indicating pointer of the gauge.

For any given angle of the pointer, two of the terminals Tc,Tx and Ty receive one or other of the two voltage levels continuously, whilst the other terminal receives a signal alternating between these two voltage levels with a duty cycle related to the angle at which the pointer is to be maintained. Referring particularly to FIG. 2, for pointer angles in the range 0° to 45°, switch Sc maintains terminal Tc at the 0 voltage level (which may be expressed as a duty cycle of 0) and switch Sx maintains terminal Tx at the +V voltage level (a duty cycle of 1), whilst switch Sy applies the variable duty signal to terminal Ty. It can be shown that for the angle range 0° to 45°, the duty cycle of this variable duty signal should be proportional to $\tan \theta$ to produce a pointer angle of $\theta$.

For pointer angles between 45° and 90°, terminal Ty now remains at the +V voltage level (being the level to which it progressively changed over the range 0° to 45°), terminal Tc remains at the 0 voltage level, and terminal Tx receives the variable duty signal, the duty cycle of which changes progressively from 1 to 0 in proportion to $1/\tan \theta$ over the range 45° to 90°.

For pointer angles between 90° and 180°, terminal Tx now remains at 0 volts (duty cycle of 0) terminal Ty remains at +V (duty cycle of 1) and terminal Tc receives the variable duty signal, the duty cycle of which progressively changes from 0 to 1 in proportion to $1/(1-\tan \theta)$ over this range of pointer angles.

For pointer angles between 180° and 225°, terminal Tc remains at +V (duty cycle of 1), terminal Tx remains at 0 volts (duty cycle of 0) and terminal Ty receives the variable duty signal with its duty cycle progressively changing from 1 to 0 in proportion to $(1-\tan \theta)$.

For pointer angles between 225° and 270°, the terminal Ty remains at 0 volts (duty cycle of 0), terminal Tc remains at +V volts (duty cycle of 1) and terminal Tx receives the variable duty signal, changing its duty progressively from 0 to 1 in proportion to $1 - 1/\tan \theta$.

Finally, for pointer angles between 270° and 360°, terminal Tx remains at +V volts (duty cycle of 1), terminal Ty remains at 0 volts (duty cycle of 0) and terminal Tc receives the variable duty signal, changing its duty cycle progressively from 1 to 0 in proportion to $1/(1-1/\tan \theta)$.

It will be seen that the gauge driving system is required to provide only one variable duty signal at any one time (i.e. for any required pointer angle). Whilst this variable duty signal is applied to one of the three coil terminals, the other two terminals are connected to constant voltage levels 0 or +V volts.

It will also be seen that the pointer angle and duty cycle of the variable duty signal are always related by a tangent function and indeed tangent values for 0° to 45° are all that is required. Preferably the driving system comprises a microprocessor MP (FIG. 4) which calculates the required duty cycle, for any desired pointer angle, by reference to a look-up table LT containing tan θ values for θ between 0° and 45°. The look-up table requires relatively few values bearing in mind the shape of the tangent function between 0° and 45°. Moreover, the gradient of the tangent curve is steeper than the sine curve over a critical range so that better resolution is achieved for the same number of bits defining the duty cycle.

Figure 3:
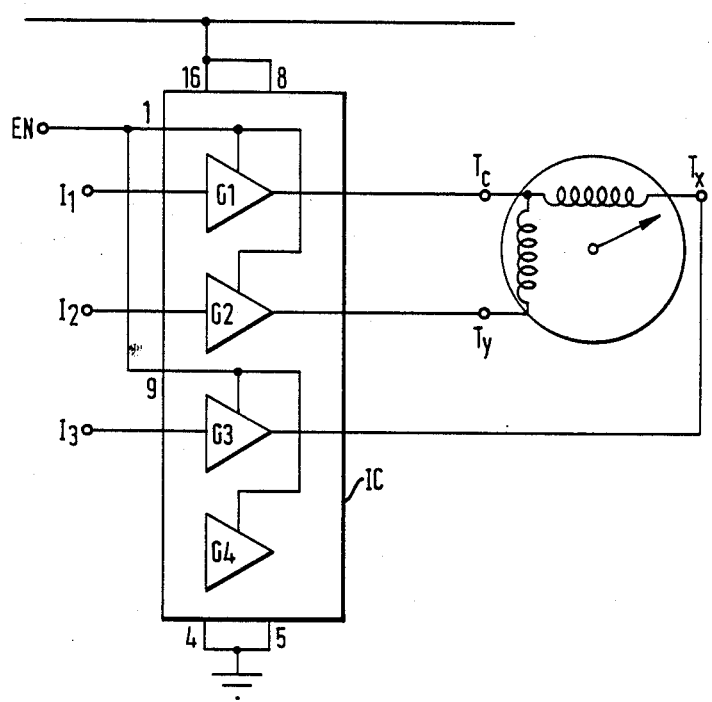
FIG. 3 is a diagram of an integrated circuit switching means which may be employed in the driving system.

FIG. 3 shows an example of switching means for the gauge, comprising an integrated circuit IC which is a 4-channel push-pull driver (e.g. an L293 device). This has 4 gates $G_1$–$G_4$, three of which are used and have their outputs connected to the terminals Tc, Tx and Ty. The gates are enabled by a signal provided by an input EN and control inputs $I_1$–$I_3$ are controlled from the microprocessor of the drive system to drive each terminal Tc, Tx, Ty to its required level of 0 or +V volts for the desired pointer angle.

Figure 4:
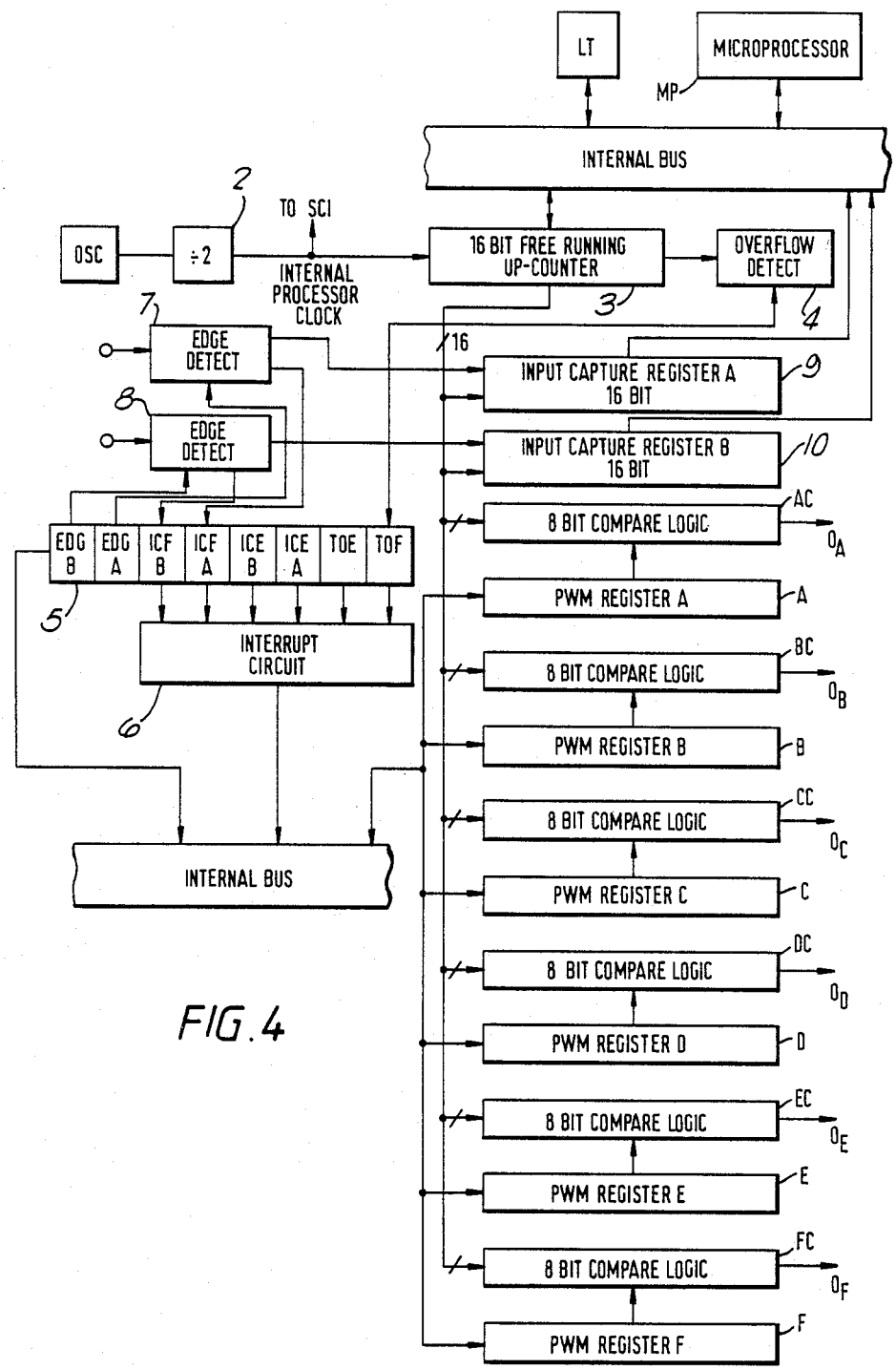
FIG. 4 is a block diagram of a timer control arrangement which may be employed in the driving system.

FIG. 4 shows an example of timer arrangement of the microprocessor drive system. An oscillator OSC has its output connected to a divide-by-two circuit 2 to provide the internal processor clock and this also drives a 16-bit free-running counter 3. When this counter rolls over, its overflow is detected at 4 and this serves to set a timer overflow flag TOF in a timer control and status register 5, serving in turn to generate an interrupt via an interrupt circuit 6. Edge detecting circuits 7, 8 receive successive pulses on their inputs from the distance and engine-speed detectors: when these edge detecting circuits respond to a transition in their inputs, they serve to latch the value of the counter 3 into respective 16-bit capture registers 9, 10, and also to set respective input capture flags ICF A, ICF B in the control and status register 5. The microprocessor reads the input capture registers 9, 10 in order to determine the vehicle speed and engine speed, for driving the speedometer and tachometer gauges. The control and status register 5 also has control bits as follows: a timer overflow interrupt enable TOE which if set enables a timer interrupt when the overflow flag is set; input capture interrupt enables ICE A and ICE B, each if set enabling a timer interrupt when the respective input capture flag ICF A or ICF B is set; and input edges EDG A and EDG B which determine the transition direction of the pulse edges, received by detecting circuits 7, 8, which trigger the respective input capture.

A series A–F of 8-bit PWM (pulse width modulation) registers are provided, together with respective 8-bit compare logic circuits AC–FC, which provide outputs $O_A$–$O_F$ for controlling the speedometer and tachometer gauges and other gauges of the vehicle. The microprocessor serves to write into the respective PWM registers values calculated from the measured vehicle speed, engine speed and other parameters, and determined for driving the gauges to provide the correct indications. Each compare logic circuit continuously compares 8-bits (bits 4 to 11) of the count accumulating in counter 3 with the value held in the respective PWM register and provides a logic "1" output so long as the count in counter 3 is less than the value held in that PWM register. Thus each compare logic circuit provides a pulse train of fixed duty cycle until the contents of its associated PWM register are changed.

Figure 5:
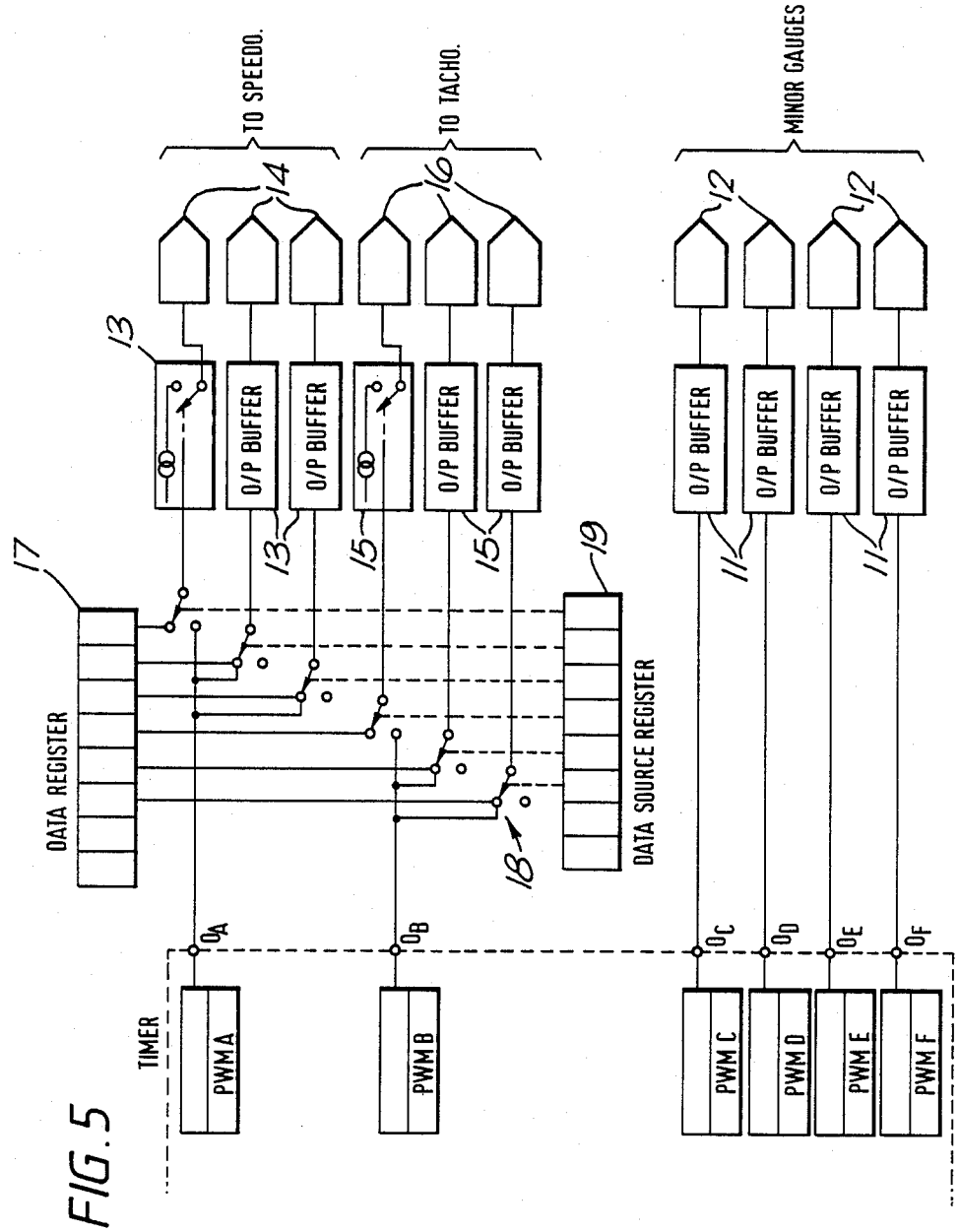
FIG. 5 is a block diagram of an output steering circuit arrangement for use with the timer control arrangement of FIG. 4.

Referring to FIG. 5, the outputs $O_C$–$O_F$ of the compare logic circuits associated with PWM registers C-F drive respective minor gauges of the vehicle via output buffers 11 and individual drive circuits 12. The speedometer gauge has its three terminals driven via output buffers 13 and drive circuits 14 and the tachometer has its three terminals driven via output buffers 15 and drive circuits 16. However, these buffers 13 or 15 receive their control signals either from the outputs $O_A$, $O_B$ of the timer of FIG. 4, or from a data register 17, according to the setting of switches 18 controlled by a data source register 19. Thus in operation, data source register 19 controls the switches 18 to determine which one of buffers 13 will receive the pulse train from output $O_A$ of the timer: the other two buffers of each set 13,15 will be connected to receive respective bits from the data register 17. Depending whether the respective bit of data register 17 is logic "1" or "0", the gauge terminal controlled through the respective buffer will receive either the 0 or +V volts signal level.

What is claimed is:

1. In an air-core gauge comprising first and second magnetic field-generating coils each with first and second ends, a first connection point connected to the first end of the first coil and to the first end of the second coil, second and third connection points at the second ends of the respective coils, and a rotatably-mounted pointer means within the magnetic fields generated by the two coils having a reference position: a driving system comprising means providing two signal levels, switching means for selectively connecting each of said connection points to either of said two signal levels, and driving means for controlling said switching means so that one of said connection points is connected alternately to said two signal levels with variable duty cycle to turn said pointer means through a corresponding angle from said reference position, wherein said switching means and driving means serve, for any given angle of said pointer means relative to said reference position, to connect only one of said connection points alternately to said two signal levels whilst at the same time maintaining each of the other connection points at either of the two signal levels.

2. A driving system as claimed in claim 1, in which the driving means provides a variation in said duty cycle between 0 and 1 over a range of angles for the pointer means to progressively change the respective connection point from one said signal level to the other.

3. A driving system as claimed in claim 2, in which for the next range of angles for the pointer means, the driving means maintains the new signal level on the respective connection point and applies a progressively changing duty cycle to another of said connection points.

4. A driving system as claimed in claim 1, in which said driving means serves for any given angle of said pointer means to maintain one of said connection points at one said signal level and to maintain another said connection point at the other said signal level.

5. A driving system as claimed in claim 1, in which said driving means comprises storing means for holding a value representing the desired angle of said pointer-means, a free-running counter, and a comparing means serving to compare the value held by the storing means with the count in the counter and provide a first output so long as the count in the counter is less than the value held in the storing means, the output of the comparing means being applied to said switching means for connecting one of said connection points alternately to said two signal levels.

6. A driving system as claimed in claim 5, in which said switching means comprises a selecting means for determining which of said connection points is alternately switched by the output of said comparing means.

7. A driving means as claimed in claim 6, in which said selecting means comprises a first data register having respective stages controlling a plurality of switches which determine whether the respective connection points are controlled by the output of the comparing means or by the contents of respective stages of a second data register.

8. A driving system as claimed in claim 1, in which a microprocessor is provided together with a look-up table (LT) containing $\tan \theta$ values for a range of angles $\theta$ of the pointer means, the microprocessor serving to determine the required duty cycle for a given angle 0 by reading a corresponding $\tan \theta$ value and calculating an appropriate function of $\tan \theta$.

9. In an air-core gauge comprising first and second magnetic field-generating coils each with first and second ends, a first connection point connected to the first end of the first coil and to the first end of the second coil, second and third connection points at the second ends of the respective coils, and a rotatably-mounted pointer means within the magnetic fields generated by the two coils and having a reference position; a driving system comprising means providing two signal levels, switching means for selectively connecting each of said connection points to either of said two signal levels, and driving means for controlling said switching means so that one of said connection points is connected alternatively to said two signal levels with variable duty cycle to turn said pointer means through a corresponding angle from said reference position, wherein the driving means provides a variation in said duty cycle between 0 and 1 over a range of angles for the pointer means to progressively change the respective connection point from one said signal level to the other, wherein for the next range of angles for the pointer means, the driving means maintains the new signal level on the respective connection point and applies a progressively changing duty cycle to another of said connection points.

10. In an air-core gauge comprising first and second magnetic field-generating coils each with first and second ends, a first connection point connected to the first end of the first coil and to the first end of the second coil, second and third connection points at the second ends of the respective coils, and a rotatably-mounted pointer means within the magnetic fields generated by the two coils and having a reference position: a driving system comprising means providing two signal levels, switching means for selectively connecting each of said connection points to either of said two signal levels, and driving means for controlling said switching means so that one of said connection points is connected alternately to said two signal levels with variable duty cycle to turn said pointer means through a corresponding angle from said reference position, wherein said driving means comprises storing means for holding a value representing the desired angle of said pointer-means, a free-running counter, and a comparing means serving to compare the value held by the storing means with the count in the counter and provide a first output so long as the count in the counter is less than the value held in the storing means, the output of the comparing means being applied to said switching means for connecting one of said connection points alternatively to said two signal levels, wherein said switching means comprises a selecting means for determining which of said connection points is alternately switched by the output of said comparing means.

11. A driving means as claimed in claim 10, in which said selecting means comprises a first data register having respective stages controlling a plurality of switches which determine whether the respective connection points are controlled by the output of the comparing means or by the contents of respective stages of a second data register.

* * * * *